(12) United States Patent
High et al.

(10) Patent No.: US 10,594,495 B2
(45) Date of Patent: Mar. 17, 2020

(54) VERIFYING AUTHENTICITY OF COMPUTER READABLE INFORMATION USING THE BLOCKCHAIN

(71) Applicant: Walmart Apollo, LLC, Bentonville, AR (US)

(72) Inventors: Donald R. High, Noel, MO (US); Bruce Walter Wilkinson, Rogers, AR (US); Todd Mattingly, Bentonville, AR (US); Brian Gerard McHale, Oldham (GB); John J. O'Brien, V, Farmington, AR (US); Robert Cantrell, Herndon, VA (US); Joseph Jurich, Molino, FL (US)

(73) Assignee: Walmart Apollo, LLC, Bentonville, AR (US)

( * ) Notice: Subject to any disclaimer, the term of this patent is extended or adjusted under 35 U.S.C. 154(b) by 150 days.

(21) Appl. No.: 15/840,792

(22) Filed: Dec. 13, 2017

(65) Prior Publication Data
US 2018/0183606 A1 Jun. 28, 2018

Related U.S. Application Data
(60) Provisional application No. 62/438,728, filed on Dec. 23, 2016.

(51) Int. Cl.
| | | |
|---|---|---|
| *H04L 9/32* | (2006.01) | |
| *G06F 16/23* | (2019.01) | |
| *G06F 21/64* | (2013.01) | |
| *H04L 9/30* | (2006.01) | |

(52) U.S. Cl.
CPC ........ *H04L 9/3247* (2013.01); *G06F 16/2365* (2019.01); *G06F 21/64* (2013.01);
(Continued)

(58) Field of Classification Search
CPC ...... G06F 16/2365; G06F 21/64; G06F 21/33; G06F 3/00; H04L 2209/38; H04L 9/30;
(Continued)

(56) References Cited

U.S. PATENT DOCUMENTS

| | | | |
|---|---|---|---|
| 9,331,856 B1 | 5/2016 | Song | |
| 2012/0204232 A1* | 8/2012 | Michael | ................. G06F 21/10 726/4 |

(Continued)

OTHER PUBLICATIONS

International Search Report and Written Opinion for PCT Application No. PCT/US17/66141, dated Mar. 7, 2018.
(Continued)

*Primary Examiner* — Abiy Getachew
(74) *Attorney, Agent, or Firm* — Schmeiser, Olsen & Watts LLP

(57) ABSTRACT

A method for ensuring that a computer readable information is authentic, including: generating a public key associated with the computer readable information, hashing the computer readable information to obtain a hashed computer readable information, encrypting the hashed computer readable information with a private key to create a digital signature, wherein the hashed computer readable information and the digital signature are stored on a block of a blockchain, authenticating the user computing device in response to a request from the user computing device to download the computer readable information, transmitting the public key and the digital signature to an authenticated user computing device, and instructing the authenticated user computing device to decrypt the digital signature using the public key to obtain the hashed computer readable information, and download the hashed computer readable information to the authenticated user computing system to retrieve the computer readable information.

20 Claims, 6 Drawing Sheets

(52) U.S. Cl.
CPC .............. *H04L 9/30* (2013.01); *H04L 9/3236* (2013.01); *H04L 9/3239* (2013.01); *H04L 2209/38* (2013.01)

(58) Field of Classification Search
CPC ..... H04L 9/3236; H04L 9/3239; H04L 9/324; H04L 2209/26; H04L 9/3026; H04L 9/3073; H04L 63/0823; H04L 9/3247; H04L 9/3263; B60K 2370/589; B60K 37/06
See application file for complete search history.

(56) References Cited

U.S. PATENT DOCUMENTS

| | | |
|---|---|---|
| 2016/0164884 A1 | 6/2016 | Sriram et al. |
| 2016/0261685 A1 | 9/2016 | Chen et al. |
| 2016/0283920 A1 | 9/2016 | Fisher et al. |
| 2016/0292680 A1 | 10/2016 | Wilson, Jr. et al. |
| 2016/0300234 A1* | 10/2016 | Moss-Pultz ............. G06F 21/10 |
| 2016/0306982 A1 | 10/2016 | Seger, II et al. |
| 2016/0330027 A1* | 11/2016 | Ebrahimi .............. H04L 9/3066 |

OTHER PUBLICATIONS

Cawrey, Daniel "Why New Forms of Spam Could Bloat Bitcoin's Block Chain," CoinDesk.com, Sep. 3, 2014.
MAbtc, "Hard forks and Consensus Networks: Meta Questions and Limitations," CoinTimes.tech, Aug. 29, 2016.
Holiman, "Stopping Spam," Gist.GitHub.com, Sep. 2015.
Cawrey, Daniel "Bitmessage is the Bitcoin of online communication," CoinDesk.com, Jun. 3, 2013.
International Preliminary Report on Patentability for application No. PCT/US2017/066141 dated Jul. 4, 2019.

* cited by examiner

VERIFYING AUTHENTICITY OF COMPUTER READABLE INFORMATION USING THE BLOCKCHAIN

RELATED APPLICATIONS

This application claims the benefit of U.S. Provisional Patent No. 62/438,728 filed Dec. 23, 2016, entitled "Verifying Authenticity of Computer Readable Information Using the Blockchain," the contents of which are incorporated by reference herein in their entirety.

FIELD OF TECHNOLOGY

The following relates to verifying authenticity of computer readable information, and more specifically to a method and system for verifying authenticity of computer readable information using the blockchain.

BACKGROUND

Downloadable information is available over the Internet for consumption by end-users. Many times, malicious software programs ("malware") are disguised as desirable downloadable information, which infects end-user computers with viruses, trojan horses, ransomware, and other malicious software. Users mistakenly download the malicious software believing that the download is from a trusted source, such as a software update released by a software company, only to discover that the original download has been changed or replaced to include malware.

Thus, there is a need for a method and system for verifying an authenticity and/or integrity of a download.

SUMMARY

A first aspect relates to a method for ensuring that a computer readable information received by a user computing device is authentic, comprising: generating, by a processor of a computing system, a public key associated with the computer readable information, wherein the computer readable information is created by a trusted source, hashing, by the processor, the computer readable information to obtain a hashed computer readable information, encrypting, by the processor, the hashed computer readable information with a private key to create a digital signature, wherein the hashed computer readable information and the digital signature are stored on a block of a blockchain, authenticating, by the processor, the user computing device in response to a request from the user computing device to download the computer readable information, transmitting, by the processor, the public key and the digital signature to an authenticated user computing device, and instructing, by the processor, the authenticated user computing device to decrypt the digital signature using the public key to obtain the hashed computer readable information, and download the hashed computer readable information to the authenticated user computing system to retrieve the computer readable information, wherein an integrity of the computer readable information is preserved by the blockchain, such that the computer readable information downloaded by the user computing device remains unchanged from the computer readable information offered by the trusted source.

A second aspect relates to a computer system, comprising: a processor, a memory device coupled to the processor, and a computer readable storage device coupled to the processor, wherein the storage device contains program code executable by the processor via the memory device to implement a method for ensuring that a computer readable information received by a user computing device is authentic, the method comprising: generating, by a processor of a computing system, a public key associated with the computer readable information, wherein the computer readable information is created by a trusted source, hashing, by the processor, the computer readable information to obtain a hashed computer readable information, encrypting, by the processor, the hashed computer readable information with a private key to create a digital signature, wherein the hashed computer readable information and the digital signature are stored on a block of a blockchain, authenticating, by the processor, the user computing device in response to a request from the user computing device to download the computer readable information, transmitting, by the processor, the public key and the digital signature to an authenticated user computing device, and instructing, by the processor, the authenticated user computing device to decrypt the digital signature using the public key to obtain the hashed computer readable information, and download the hashed computer readable information to the authenticated user computing system to retrieve the computer readable information, wherein an integrity of the computer readable information is preserved by the blockchain, such that the computer readable information downloaded by the user computing device remains unchanged from the computer readable information offered by the trusted source.

A third aspect relates to a computer program product, comprising a computer readable hardware storage device storing a computer readable program code, the computer readable program code comprising an algorithm that when executed by a computer processor of a computing system implements a method for ensuring that a computer readable information received by a user computing device is authentic, comprising: generating, by a processor of a computing system, a public key associated with the computer readable information, wherein the computer readable information is created by a trusted source, hashing, by the processor, the computer readable information to obtain a hashed computer readable information, encrypting, by the processor, the hashed computer readable information with a private key to create a digital signature, wherein the hashed computer readable information and the digital signature are stored on a block of a blockchain, authenticating, by the processor, the user computing device in response to a request from the user computing device to download the computer readable information, transmitting, by the processor, the public key and the digital signature to an authenticated user computing device, and instructing, by the processor, the authenticated user computing device to decrypt the digital signature using the public key to obtain the hashed computer readable information, and download the hashed computer readable information to the authenticated user computing system to retrieve the computer readable information, wherein an integrity of the computer readable information is preserved by the blockchain, such that the computer readable information downloaded by the user computing device remains unchanged from the computer readable information offered by the trusted source.

The foregoing and other features of construction and operation will be more readily understood and fully appreciated from the following detailed disclosure, taken in conjunction with accompanying drawings.

BRIEF DESCRIPTION OF THE DRAWINGS

Some of the embodiments will be described in detail, with reference to the following figures, wherein like designations denote like members, wherein.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
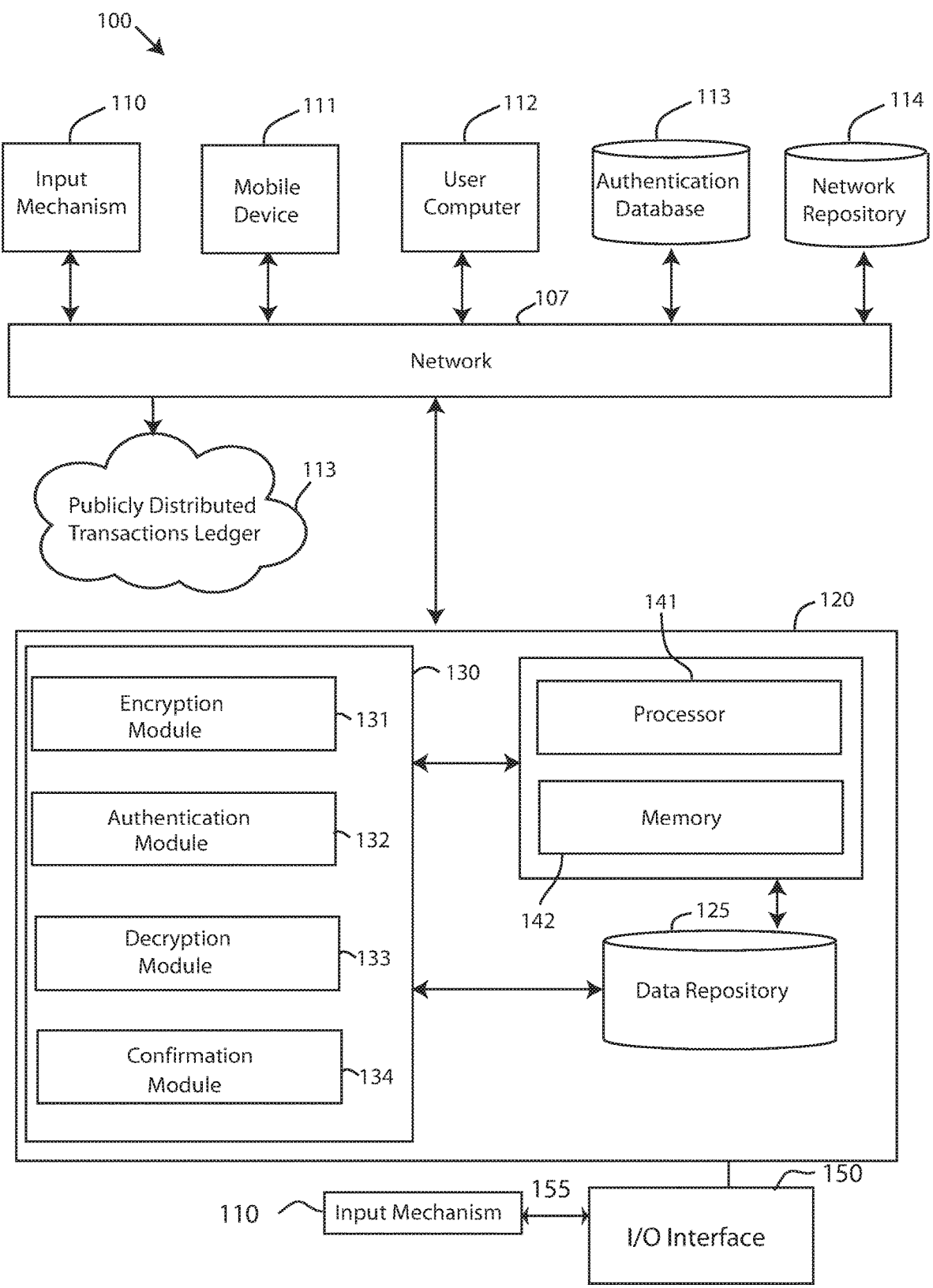
FIG. 1 depicts a block diagram of a computer security system, in accordance with embodiments of the present invention.

Referring to the drawings, FIG. 1 depicts a block diagram of a computer security system 100, in accordance with embodiments of the present invention. Embodiments of computer security system 100 may be described as a system for maintaining a security of one or more computing systems. Embodiments of the computer security system 100 may be a cybersecurity system, an IT security system, and the like, that may preserve an integrity and/or authenticity of computer readable information downloadable to a computer, which is released or otherwise provided by a trusted source. For instance, embodiments of the computer security system 100 may use the blockchain to ensure that no malicious or unknown changes to the computer readable information have occurred to the computer readable information, and/or that the computer readable information available for download matches the authentic computer readable information by accessing the authentic computer readable information stored on the blockchain. In some embodiments, the computer security system 100 may include a computing system 100, as depicted in FIG. 1, and may communicate with a user computer 112 requesting to download a computer readable information. In some embodiments, a computing system 120 of the computer security system 100 may be the user computer requesting the download of the computer readable information.

Embodiments of the computer security system 100 may comprise an input mechanism 110 communicatively coupled to the computing system 120 over via an I/O interface 150 and/or over a network 107. For instance, the input mechanism 110 may be connected via an I/O interface 150 to computer system 120 via data bus line 155 and/or over network 107. As shown in FIG. 1, the input mechanism 110 may transmit information/data to the computing system 120. For example, one or more input mechanisms 110 coupled to the computing system 120 may capture information relating to a user of a computer or a user environment containing the computer requesting download of computer readable information, and transmitting the information to the computing system 120 via the data bus line 155 to an I/O interface 150. An I/O interface 150 may refer to any communication process performed between the computer system 120 and the environment outside of the computer system 120, for example, the input mechanism 110. Input to the computing system 120 may refer to the signals or instructions sent to the computing system 120, for example the data collected, detected, captured, etc. by the input mechanism 110, while output may refer to the signals sent out from the computer system 120, such as a command to the input mechanism 110 to initiate a recording sequence or take an image.

Alternatively, the input mechanism 110 may capture information relating to a user of a computer or a user environment containing the computer requesting download of computer readable information, and transmit the collected information or otherwise notify the computing system 120 over network 107. Additionally, the computing system 120 may receive data from a mobile device 111. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, input mechanism 110, mobile device 111, and user computer 112, a connection to one or more network accessible knowledge bases containing information of one or more users, network repositories 114 or other systems connected to the network 107 that may be considered nodes of the network 107. In some embodiments, where the network repositories 114 allocate resources to be used by the other nodes of the network 107, the computing system 120 and network repository 114 may be referred to as servers.

The network repository 114 may be a data collection area on the network 107 which may back up and save all the data transmitted back and forth between the nodes of the network 107. For example, the network repository 114 may be a data center saving and cataloging data regarding downloads to a particular user computer to generate both historical and predictive reports regarding a particular user; additionally, changes in the blockchain may also be saved and catalogued. In some embodiments, a data collection center housing the network repository 114 may include an analytic module capable of analyzing each piece of data being stored by the network repository 114. Further, the computing system 120 may be integrated with or as a part of the data collection center housing the network repository 114. In some alternative embodiments, the network repository 114 may be a local repository (not shown) that is connected to the computing system 120.

Referring still to FIG. 1, embodiments of the computing system 120 may receive data and other information from the input mechanism 110 and the mobile device 111 which may be present internal or external to an environment shared by the user computer 112, at a point when the user computer 112 requests to download computer readable information. Embodiments of the computer readable information may be machine readable information, software code and logic, data, instructions, and the like, and may be downloadable over network 107, or other/additional network. Further, embodiments of computer readable information may be a software update for a software application released by a trusted source, such as the software company or developer, a video file, an application, audio file, an audio/visual file, a browser executable code, hyperlink, or any downloadable information that is readable by user computer 112. Moreover, embodiments of the input mechanism 110 may be a sensor, an input, an input device, or any device that can gather information regarding a user or user computer 113. For instance, embodiments of the input mechanism 111 may be a camera, a scanner, a RFID scanner, an optical sensor, and the like, that may capture identifying information of the user or the user computer 112 and communicate with a processor of the user computer 112. The input mechanism 110 may scan, photograph, record, capture, collect, analyze, read or otherwise retrieve information associated with the user of a user computer 112, the user computer 112, or an environment having one or both of the user and the user computer 112. The input mechanism 110 may have a transmitter for transmitting scanned or captured information to the computing system 120. Embodiments of the input mechanism 110 may be placed around or otherwise near the user (e.g. camera placed in office), may be a component of a peripheral device (e.g. microphone of smart home device), or may be a built-in hardware component of user computer 112 (e.g. camera of user computer). Furthermore, embodiments of the mobile device 111 may also scan, photograph, record, capture, collect, analyze, read or otherwise retrieve information/data associated with the user or the user computer 112, and transmit to the computing device 120.

Figure 2:
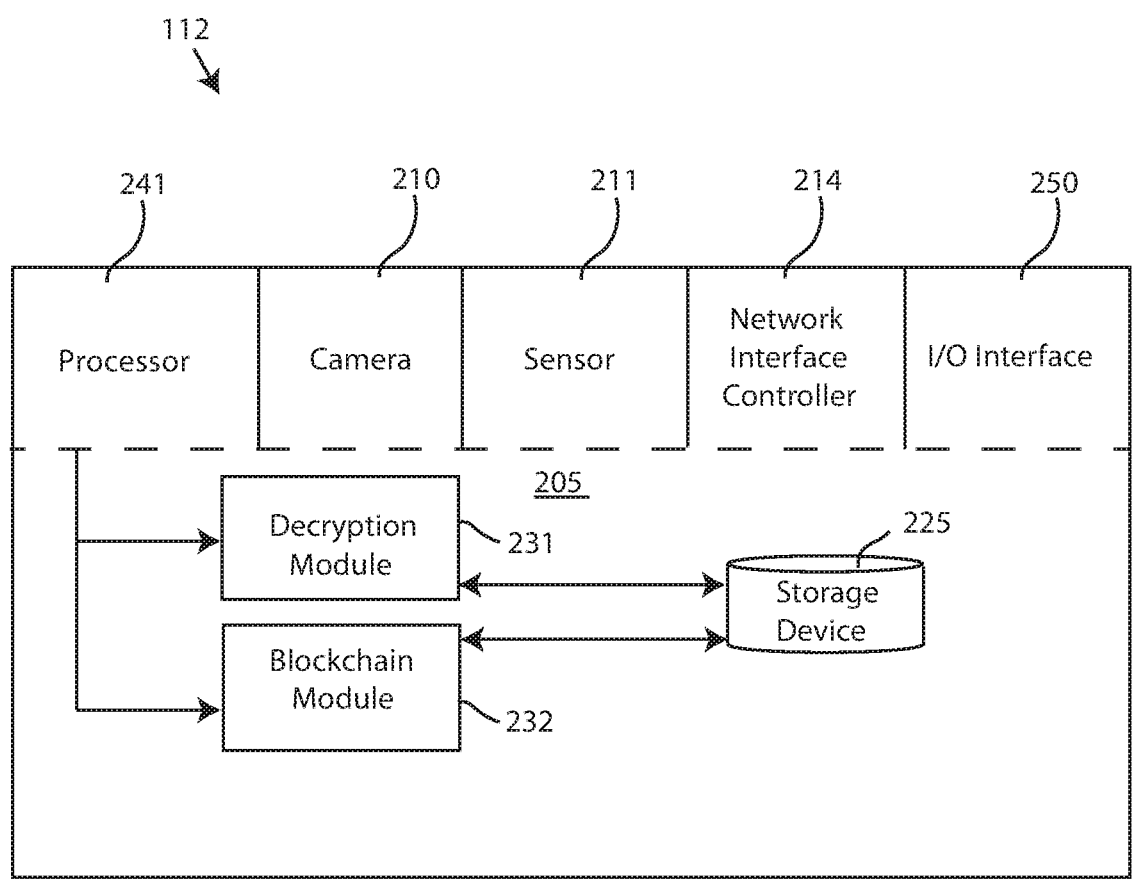
FIG. 2 depicts a block diagram of a user computer, in accordance with embodiments of the present invention.

FIG. 2 depicts a block diagram of a user computer 112, in accordance with embodiments of the present invention. Embodiments of the user computer 112 may be a computing device, a personal computer, a wearable device, a tablet computer, a smartphone, a smart home device, or any electronic device that can cooperate and/or communicate with the computing system 120 to verify an authenticity of a downloadable computer readable information. The user computer 112 may be connected to the computing system 120 over network 107. Furthermore, embodiments of the user computer 112 may include software and hardware components, such as a processor 241, camera 210, sensor 211, network interface controller 214, and I/O interface 250. Software components of the user computer 112 may be located in a memory system 205 of the user computer 112. Embodiments of the user computer 112 may include a processor 241 for implementing the tasks associated with the user computer 112. The sensor 211 (or specialized chip) may collect and/or analyze various information that may be communicated to the input mechanism 110 and/or to the computing system 120, such as identifying information of the device and/or user associated with the sensor 211. Embodiments of the sensor 211 may be a fingerprint sensor proximate the keyboard of the user computer, or a biometric scanner of the user computer 112, and the like. Further, embodiments of the user computer 112 may include a camera 210 to verify the user or the environment. For example, the user may be required to scan a fingerprint using a sensor 211 or provide a facial image using the camera 210 to the computing system 120 for authentication purpose, in response to requesting or initiating a download of computer readable information.

Embodiments of the network interface controller 214 may be a hardware component of the user computer 112 that may connect the user computer 112 to network 107. The network interface controller 214 may transmit and receive data, including the transmission of commands and of data stored on the user computer 112. In some embodiments, the data, such as a public key, may be stored in storage device 225 of memory system 205 of the user computer 112, when received from the computing system 120. The network interface controller 214 may access the storage device 225, and transmit data over the network 107 to the computing system 120. Additionally, embodiments of user computer 112 may include an I/O interface 250. An I/O interface 250 may refer to any communication process performed between the user computer 112 and the environment outside of the user computer 112.

Furthermore, embodiments of the memory system 205 of the user computer 112 may include a decryption module 231 and a blockchain module 232. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory system 205 of the user computer 112. A module (whether hardware, software, or a combination thereof) may be designed to implement or execute one or more particular functions or routines.

Embodiments of decryption module 231 may include one or more components of hardware and/or software program code for decrypting a digital signature using a public key transmitted by the computing system 120 to obtain a hashed computer readable information associated with a particular download, such as a software update. As will be described in greater detail infra, embodiments of the decryption module 231 may apply a decryption using a cryptographic key to obtain a hashed computer readable information, which is stored on a block of the blockchain. Moreover, embodiments of the user computer 112 may include a blockchain module 232. Embodiments of the blockchain module 232 may include one or more components of hardware and/or software program code for confirming that the hashed computer readable information available for download matches and/or corresponds to the hashed computer readable information stored on the blockchain when the authentic computer readable information was released or otherwise made available for download by a trusted source.

Referring back to FIG. 1, embodiments of the computing system 120 may include a computer security application 130. In some embodiments, the computer security application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the computer security application 130. Embodiments of the computer security application 130 may be an interface, an application, a program, a module, or a combination of modules. In an exemplary embodiment, the computer security application 130 may be a software application running on one or more back end servers, servicing a user computing device 112, or may be a software application running on the computing device 112, wherein the user computing device 112 is a node of the blockchain 115.

Moreover, embodiments of the computer security application 130 may include an encryption module 131, an authentication module 132, a decryption module 133, and a confirmation module 134. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the encryption module 131 may include one or more components of hardware and/or software program code for generating a public key associated with a computer readable information, hashing the computer readable information, and encrypting the hashed computer readable information using the private key. For instance, embodiments of the encryption module 131 may generate, create, establish, spawn, or otherwise provide a cryptographic private key that is associated with computer readable information that may be available for download by an end-user. The computer readable information may be available forever or may be valid for a limited time. Embodiments of the computer readable information may be of arbitrary size, both large and small. In response to receiving the computer readable information, the encryption module 131 may hash the computer readable information using a hashing function to map the data of arbitrary size to a fixed size. For instance, the encryption module 131 may hash the computer readable information using a cryptographic hashing function.

Figure 3:
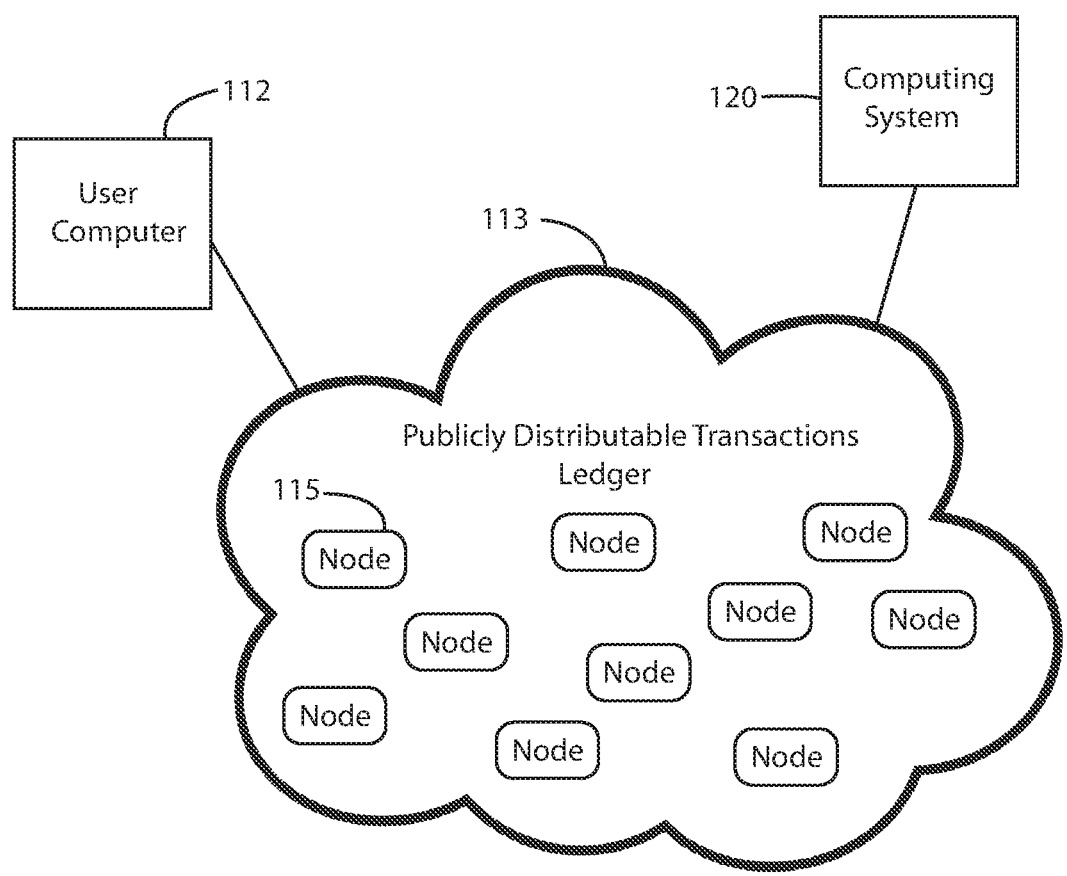
FIG. 3 depicts an embodiment of a publicly distributable transactions ledger, in accordance with embodiments of the present invention.

Moreover, embodiments of the encryption module 131 may encrypt the hashed computer readable information (or encrypt the computer readable information without performing a hashing function). The computer readable information or the hashed computer readable information may be encrypted with the private key (or public key in some alternative embodiments) to create a digital signature. The private key and the public key may be generated by the encryption module 131 at the same time. The public key and the private key may be generated in response to receiving the computer readable information, or in response to receiving a notification that the computer readable information is ready for release. Embodiments of the private key and the public key may be cryptographic keys. The private key may be unique to one device, person, account, etc. In one embodiment, the hashed computer readable information may be encrypted with the private key to create a digital signature. In other embodiments, the hashed computer readable information may be encrypted with the public key to create a digital signature. Embodiments of the digital signature may then be stored on a block of a blockchain, such as publicly distributed transaction ledger 113. Embodiments of the computing system 120 may further include a blockchain module(s) that include one or more components of hardware and/or software program code for accessing and/or utilizing the publicly distributed transactions ledger 113 (i.e. blockchain) to store and/or view transaction information, such as the hashed computer readable information and the digital signature, details regarding the source of the computer readable information, metadata of the computer readable information, time details, and the like, using the public key and/or the private key generated by the computing system 120. Transaction information may be recorded on the publicly distributable transactions ledger 113. The recordation of the computer readable information-related transactions is immutable and almost impossible to fraudulently change the details of the transactions stored on the ledger 113 due to the nature of the decentralized ledger, otherwise referred to as the blockchain. FIG. 3 depicts an embodiment of a publicly distributable transactions ledger 113, in accordance with embodiments of the present invention. Embodiments of ledger 113 may be a distributed peer-to-peer network, including a plurality of nodes 115. The ledger 113 may represent a computing environment for operating a decentralized framework that can maintain a distributed data structure. In other words, ledger 113 may be a secure distributed transaction ledger or a blockchain that may support document management. Each node 115 may maintain an individual public ledger (i.e. maintained publicly) according to set procedures that employ cryptographic methods and a proof-of-work concept. In view of the public nature of the ledger and the proof-of-work concept, the nodes 115 collectively create a decentralized, trusted network. Further, embodiments of the publicly decentralized trusted ledger 113 may be accessible by the computing system 120 and the user computer 112 for verifying a transaction, completing a transaction, or viewing transactions details.

Figure 4:
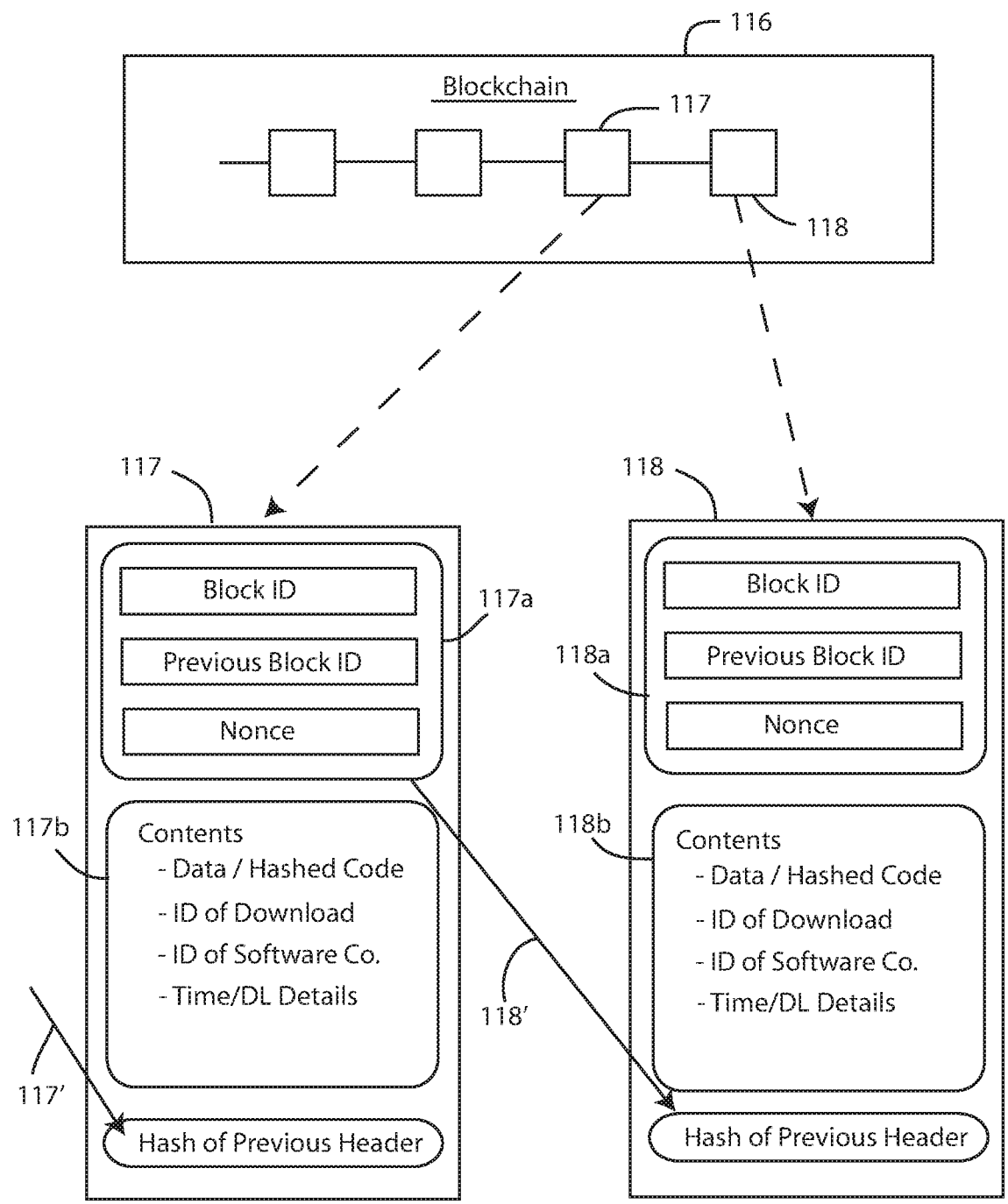
FIG. 4 depicts a blockchain and two exemplary blocks of the blockchain, in accordance with embodiments of the present invention.

FIG. 4 depicts a blockchain 116 and two exemplary blocks 117, 118 of the blockchain 116, in accordance with embodiments of the present invention. Embodiments of the blockchain 116 may represent the publicly distributable transactions ledger 113, and may include a plurality of blocks. Each block, such as block 117 and block 118 may include data regarding recent transactions and/or contents relating to computer readable information, linking data that links one block 118 to a previous block 117 in the blockchain, proof-of-work data that ensures that the state of the blockchain 116 is valid, and is endorsed/verified by a majority of the record keeping system. The confirmed transactions of the blockchain are done using cryptography to ensure that the integrity and the chronological order of the blockchain are enforced and can be independently verified by each node 115 of the blockchain 116. New transactions may be added to the blockchain 116 using a distributed consensus system that confirms pending transactions using a mining process, which means that each transaction can easily be verified for accuracy, but very difficult or impossible to modify. Moreover, embodiments of a block 117 of the blockchain 116 may include a header 117a and a content 117b. Embodiments of the header 117a may include a block ID, a previous block ID, and a nonce. The nonce may represent a proof-of-work. The header 117a may be used to link block 117 to other blocks of the blockchain. Embodiments of the block contents 117b may include transaction information relating to a hashed software code, identity of download, identity of source of the computer readable information, or a digital signature. Likewise, block 118 may include a header 118a and contents 118b. Block 118 includes a hash of the previous block's header (i.e. 117a), thereby linking the blocks 117, 118 to the blockchain, as shown by arrow 118'. Arrow 117' indicates a relationship between block 117 and a previous block in the blockchain 116; block 117 contains a hash of previous header of a previous block in the blockchain 116.

The transaction information cannot be modified without at least one of the nodes 115 noticing; thus, the blockchain 116 can be trusted to verify transactions occurring on the blockchain 116. Further, the computing system 120 may access the blocks of a blockchain 116 that include computer readable information-related records using the cryptographic keys. Accordingly, embodiments of the computing system may use the public key and the private key generated by the computing system 120 to gain access to blockchain 116. Furthermore, a new transaction may be generated on the blockchain to show that the user computing device 112 downloaded the computer readable information. This may prevent the user computer 112 from using the same hashed computer readable information more than once in situations where access may be granted for a single time only. The computing system 120 can treat the hashed computer readable information as one cryptocurrency unit, and when the hashed computer readable information is decrypted and/or downloaded and stored on the user computer 112, the lone cryptocurrency unit is spent. Any additional attempt to download the computer readable information will not be successful because the computing system 120 will access the blockchain, which by virtue of the distributed ledger, will not issue a consensus that the user computer 112 has a remaining cryptocurrency to spend on retrieving the computer readable information.

Referring back to FIG. 1, embodiments of the computing system 120 may include an authentication module 132. Embodiments of the authentication module 132 may include one or more components of hardware and/or software program code for authenticating a user computer 112 requesting to acquire computer readable information stored on the blockchain. A user computer 112, which may be a mobile computing device or smartphone of a user, may transmit a request to computing system 120 to download computer readable information for loading onto the user computer 112. The requested download time may be intended for an instant download to the user computer 112, or may be scheduled for a time in the future. The request may be transmitted by the user computer 112 over network 107, and may be received by the authentication module 132, for processing the request. The request from the user computer 112 may be seeking a download of the computer readable information based on a purchase for the computer readable information, an automatic update to an existing licensed software application, and the like, the transaction and/or details of which may be stored on an authentication database 113. Embodiments of the authentication database 113 may be one or more databases, servers, storage devices, nodes, etc. that store transactions relating to retrieval and deposit of computer readable information, software licenses, copyright licenses (e.g. purchased song). For example, the authentication database 113 may include data and/or information regarding a valid software license purchased by a user of the user computer 112. A user may visit a website operated by a software company that develops a software application licensed by the user, seeking a software update to the software application. The user computer 112 may send a request to the computing system 120 by clicking on a hyperlink or other executable code to retrieve or download the software update to update the software application. As part of an authenticating step of determining whether the user computer 112 is authorized or permitted to download the software update, the authentication module 132, in response to receiving the request, may access authentication database 113 to verify that indeed the user computer 112 is an authorized machine (e.g. holds a valid, license to the software application). As part of the request, the user computer 112 may also transmit unique identifying information to the computing system 120, which may also be stored on the authentication database 113. Thus, the authentication module 132 may verify the authenticity of the user computer 112. The authenticating performed by the authentication module 132 may be performed onsite or remotely. Alternatively to the authentication database 113, the transactions and/or details may be stored on the publicly distributed transactions ledger 113, wherein the computing system 120 may access the ledger 113 for authentication purposes.

Furthermore, embodiments of the computing system 120 may utilize one or more input mechanisms 110 for authentication purposes. For example, the computing system 120 may utilize data and/or information captured by the input mechanism 110 to cross-reference, confirm, bolster, verify, etc. the data and/or information retrieved from the authentication database 113, which may provide more recent information. In an exemplary embodiment, a fingerprint sensor or other biometric sensor coupled to the user computer 112 may transmit biometric information of the user of the user computer 112, in response to the computing system 120 prompting the user submit biometric information.

While the user computer 112 may need to be authenticated by the computing system 120 prior to releasing or allowing the download of the computer readable information, authentication alone may not be sufficient for completing the download. Embodiments of the computing system 120 may include a decryption module 133, which may include one or more components of hardware and/or software program code for transmitting a public key (or private key in alternative embodiments) and a digital signature to an authenticated user computer 112. For instance, embodiments of the decryption module 133 may transmit the public key and the digital signature to the user computer 112 so that the user computer 112 can decrypt the digital signature using the public key to obtain the hashed computer readable information. Because the digital signature represents an encrypted hashed computer readable information or encrypted computer readable information that was encrypted using the private key (or alternatively the public key), the public key (or alternatively the private key) may be used to decrypt the digital signature to obtain the hashed computer readable information or the computer readable information. In an exemplary embodiment, the decryption module 133 may instruct the user computer 112, upon transmission of the public key and the digital signature, to decrypt the digital signature and obtain the hashed computer readable information. In another embodiment, the decryption module 133 of the computing system 120 may transmit the public key to the user computer 112, and instruct the user computer 112 to access the ledger 113 and view the hashed computer readable information on the blockchain using the public key.

Embodiments of the computing system 120 may further include a confirmation module 134. Embodiments of the confirmation module 134 may include one or more components of hardware and/or software program code for confirming that the computer readable information about to be downloaded onto the user computer 112 has remained unchanged from the computer readable information that was initially provided by a trusted source. After using the public key to obtain the hashed computer readable information, the user computer 112 may compare the received hashed computer readable information with the computer readable information stored on the blockchain. If the received hashed computer readable information is the same as the hashed computer readable information stored on the blockchain, then the computing system 120 may allow the user computer 112 to download the computer readable information. Because of the immutable characteristics of the blockchain, the computing system 120 can be confident that a match between the hashed computer readable information available for download and the hashed computer readable information stored on the blockchain is authentic or valid. In this way, integrity of the computer readable information is preserved by the blockchain, such that the computer readable information downloaded by the user computing device 112 remains unchanged from the computer readable information offered by the trusted source. As an example, prior to downloading a software update, the computing system 120 may ensure a validity or authenticity of the software update by using the blockchain and associated cryptographic keys.

Embodiments of the computing system 120 may be equipped with a memory device 142 which may store various information and data regarding the scanned data, and a processor 141 for implementing the tasks associated with the computer security system 100.

In some embodiments, once a user computing devices 112 downloads the trusted computer readable information, verified through the blockchain, other user computers may download the computer readable information from the user computer 112 in accordance with the embodiments of the present invention. The user computer 112 may act as a node 115 of the blockchain 113 to create a decentralized update system, wherein other authenticated user computers can download the update from the user computer 112. The update, or other computer readable information, now available for download from the user computer 112 may be verified through the blockchain. The transaction documenting the download of the update to the user computer 112 may be stored in the publicly distributed transaction ledger 113, along with a hash of the previous header and the content (e.g. data/hashed code, ID of download, ID of software company, time of download, download details, etc.), which cannot be modified without a node of the ledger 113 noticing. Therefore, the subsequent user computer downloading the update from the user computer 112 can rely on the trustworthiness of the update. As more and more user computers 112 download the update using the blockchain implementing the computer security application 130, the source for the update increases and a decentralized architecture is created for storing computer software updates that, due to the immutable characteristics of the blockchain, are free of malware, viruses, or other modified software code. Accordingly, computer networking technology and computer security technology are improved because such as decentralized update system increases downloading speeds and resulting bandwidth is improved for multiple users to looking to download a trustworthy, readily available software update.

Figure 5:
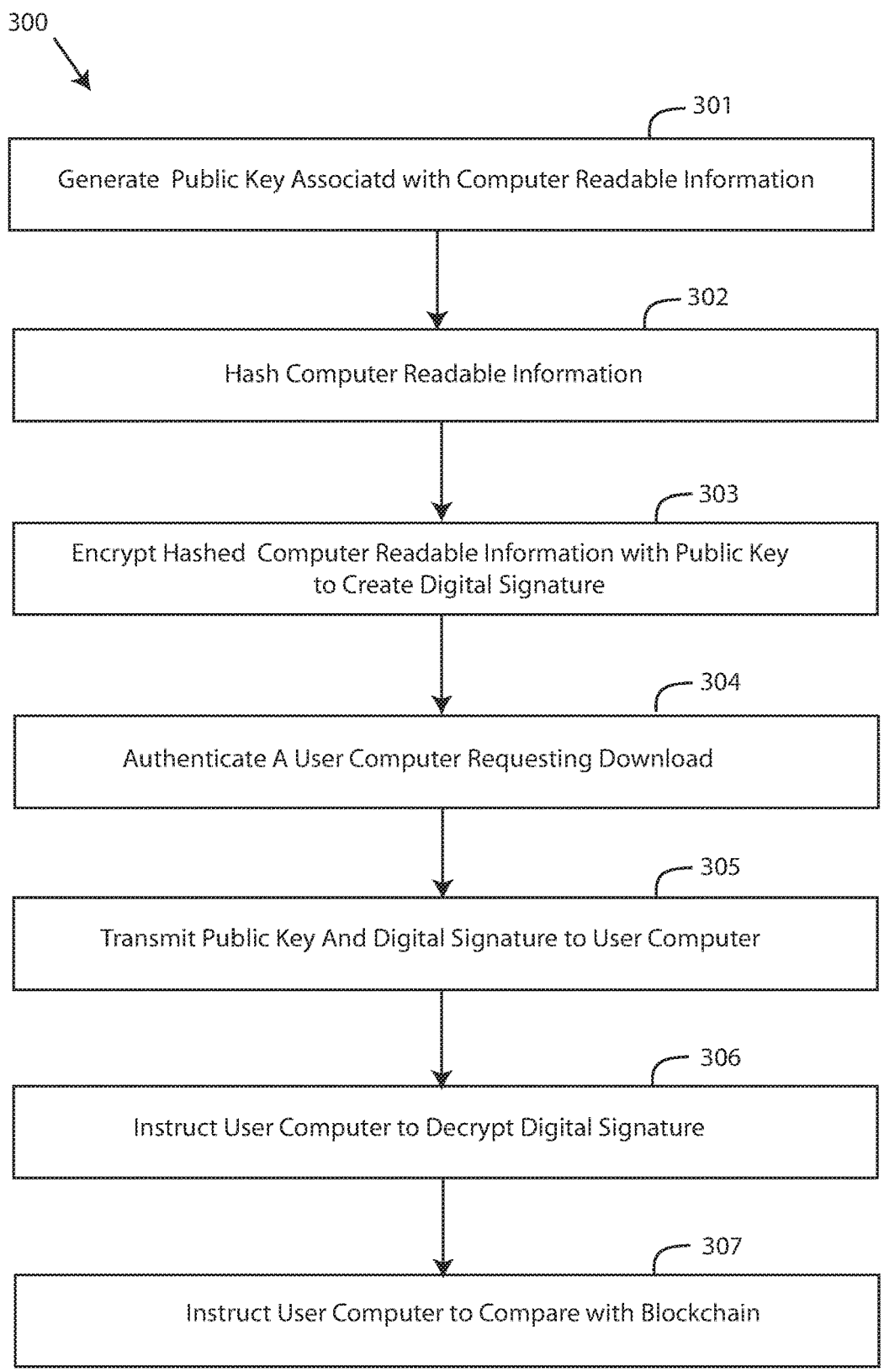
FIG. 5 depicts a flow chart of a method for verifying authenticity of computer readable information using the blockchain, in accordance with embodiments of the present invention.

Referring now to FIG. 5, which depicts a flow chart of a method 300 for ensuring that a computer readable information received by a user computing device is authentic, in accordance with embodiments of the present invention. One embodiment of a method 300 or algorithm that may be implemented for ensuring that a computer readable information received by a user computing device is authentic in accordance with the computer security system 100 described in FIG. 1 using one or more computer systems as defined generically in FIG. 6 below, and more specifically by the specific embodiments of FIG. 1.

Embodiments of the method 300 for ensuring that a computer readable information received by a user computing device is authentic may begin at step 301 wherein a private key is generated by the computing system 120, the private key being associated with a computer readable information. Step 302 hashes the computer readable information so that a size of the data/file can be uniform, or a fixed size. Step 303 encrypts the hashed computer readable information with the private key to create a digital signature. The digital signature may be stored on the blockchain, to ensure that the hashed computer readable information is not modified by an untrustworthy source. Step 304 authenticates a user computer 112 that is requesting to download or obtain the computer readable information that is available for download from a website or other platform. Authentication may include accessing the authentication database 113 and/or accessing the publicly distributable transactions ledger 113 (i.e. blockchain). Step 305 transmits a public key associated with the computer readable information, and the digital signature to authenticated user computer 112. Step 306 instructs the authenticated user computer 112 to decrypt the digital signature using the public key to obtain the hashed computer readable information. The user computer 112 may then obtain the hashed computer readable information. Step 307 instructs the user computer to compare the receiving hashed computer readable information with the hashed computer readable information stored on the blockchain, to ensure that the computer readable information has remained unchanged from the hashed computer readable information initially stored on the blockchain from the trusted source. Additionally, a new transaction may be generated to show that the user computing device 112 downloaded the computer readable information from the website or platform including available downloads.

Figure 6:
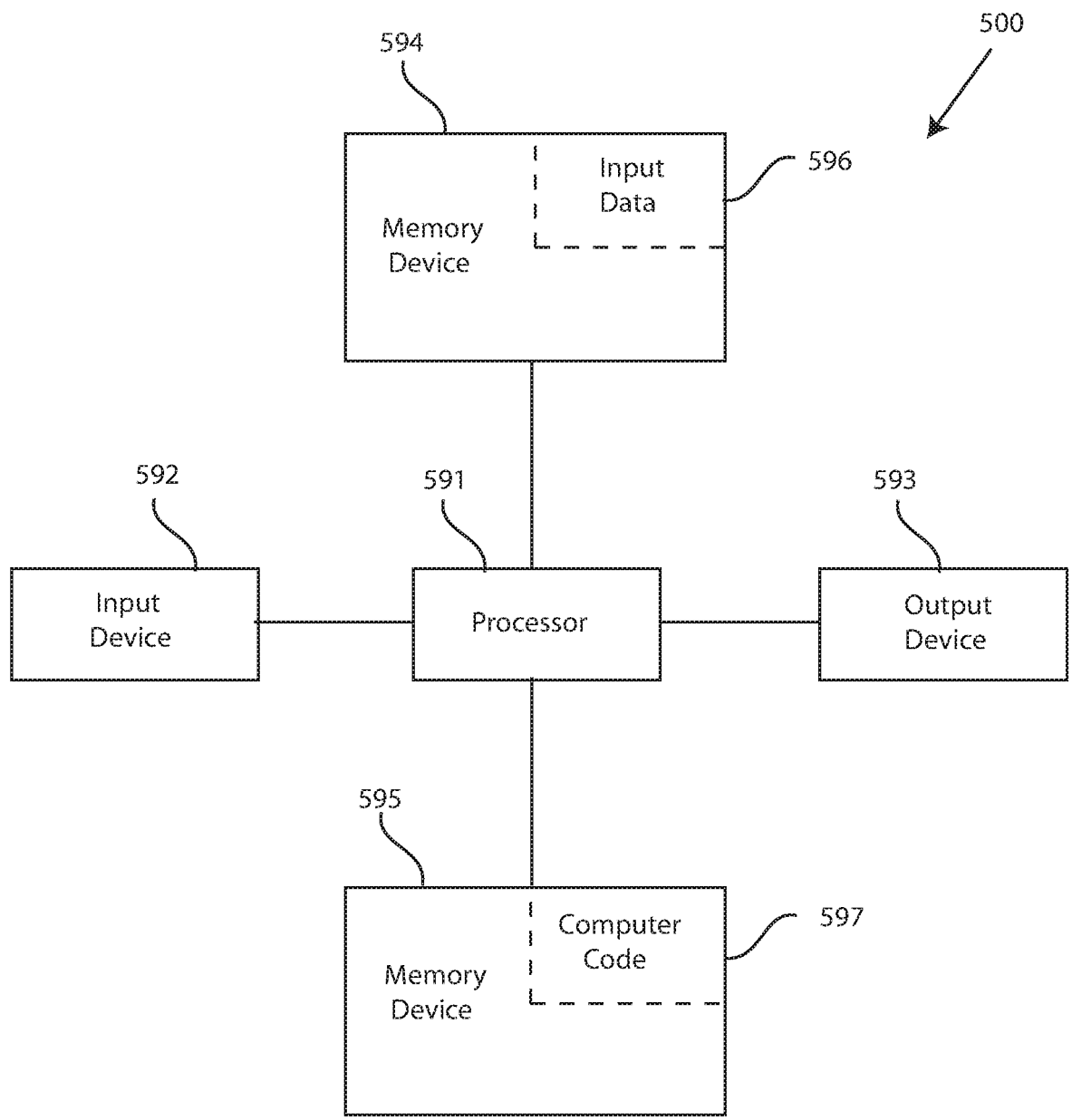
FIG. 6 illustrates a block diagram of a computer system for the computer security system of FIG. 1, capable of implementing methods for verifying authenticity of computer readable information using the blockchain, in accordance with embodiments of the present invention.

FIG. 6 illustrates a block diagram of a computer system for the computer security system 100 of FIG. 1, capable of implementing a method for ensuring that a computer readable information received by a user computing device is authentic of FIG. 5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for ensuring that a computer readable information received by a user computing device is authentic, in the manner prescribed by the embodiments of FIG. 5 using the computer security system of FIG. 1, wherein the instructions of the computer code 597 may be executed by processor 591 via memory device 595. The computer code 597 may include software or program instructions that may implement one or more algorithms for implementing the methods for ensuring that a computer readable information received by a user computing device is authentic, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the input mechanism 110 or user device 111. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to computer security systems and methods using the blockchain. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to ensure an authenticity of a computer readable information received by a user computing device. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for ensuring that a computer readable information received by a user computing device is authentic. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for ensuring that a computer readable information received by a user computing device is authentic.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
    generating, by a processor of a computing system, a public key associated with a computer readable information, wherein the computer readable information is created by a trusted source;
    hashing, by the processor, the computer readable information to obtain a hashed computer readable information;
    encrypting, by the processor, the hashed computer readable information with a private key to create a digital signature, wherein the hashed computer readable information and the digital signature are stored on a block of a blockchain;

authenticating, by the processor, a user computing device in response to a request from the user computing device to download the computer readable information;

transmitting, by the processor, the public key and the digital signature to an authenticated user computing device;

instructing, by the processor, the authenticated user computing device to decrypt the digital signature using the public key to obtain the hashed computer readable information, and download the hashed computer readable information to the authenticated user computing system to retrieve the computer readable information; and creating, by the processor, a decentralized update system including at least the authenticated user computing device that acts a node of the decentralized update system to increase a source for downloading the computer readable information, wherein other user computers download the computer readable information from the authenticated user computing device verified by the blockchain;

wherein an integrity of the computer readable information is preserved by the blockchain, such that the computer readable information downloaded by the user computing device and by the other computing devices remains unchanged from the computer readable information offered by the trusted source.

2. The method of claim 1, wherein the computer readable information at least one of data and executable code.

3. The method of claim 1, wherein the computer readable information is used to update a software application of the user computing device.

4. The method of claim 3, wherein authenticating includes accessing the blockchain to determine that the user computing device is licensed to operate the software application.

5. The method of claim 1, wherein the blockchain is a plurality of distributed nodes that maintain a public ledger of the hashed computer readable information and the digital signature, which preserves the integrity of the computer readable information.

6. The method of claim 1, wherein authenticating includes accessing the blockchain to determine whether the user computing device has made a previous request to download the computer readable information.

7. The method of claim 1, further comprising generating a transaction on the blockchain that the user computing device downloaded the computer readable information.

8. A computer system, comprising:
a processor;
a memory device coupled to the processor; and
a computer readable storage device coupled to the processor, wherein the storage device contains program code executable by the processor via the memory device to implement a method comprising:
generating, by a processor of a computing system, a public key associated with a computer readable information, wherein the computer readable information is created by a trusted source;
hashing, by the processor, the computer readable information to obtain a hashed computer readable information;
encrypting, by the processor, the hashed computer readable information with a private key to create a digital signature, wherein the hashed computer readable information and the digital signature are stored on a block of a blockchain;

authenticating, by the processor, a user computing device in response to a request from the user computing device to download the computer readable information;

transmitting, by the processor, the public key and the digital signature to an authenticated user computing device;

instructing, by the processor, the authenticated user computing device to decrypt the digital signature using the public key to obtain the hashed computer readable information, and download the hashed computer readable information to the authenticated user computing system to retrieve the computer readable information; and creating, by the processor, a decentralized update system including at least the authenticated user computing device that acts a node of the decentralized update system to increase a source for downloading the computer readable information, wherein other user computers download the computer readable information from the authenticated user computing device verified by the blockchain;

wherein an integrity of the computer readable information is preserved by the blockchain, such that the computer readable information downloaded by the user computing device remains unchanged from the computer readable information offered by the trusted source.

9. The computer system of claim 8, wherein the computer readable information at least one of data and executable code.

10. The method of claim 1, wherein the computer readable information is used to update a software application of the user computing device.

11. The computer system of claim 8, wherein authenticating includes accessing the blockchain to determine that the user computing device is licensed to operate the software application.

12. The computer system of claim 8, wherein the blockchain is a plurality of distributed nodes that maintain a public ledger of the hashed computer readable information and the digital signature, which preserves the integrity of the computer readable information.

13. The computer system of claim 8, wherein authenticating includes accessing the blockchain to determine whether the user computing device has made a previous request to download the computer readable information.

14. The computer system of claim 8, further comprising generating a transaction on the blockchain that the user computing device downloaded the computer readable information.

15. A computer program product, comprising a computer readable hardware storage device storing a computer readable program code, the computer readable program code comprising an algorithm that when executed by a computer processor of a computing system implements a method comprising:
generating, by a processor of a computing system, a public key associated with a computer readable information, wherein the computer readable information is created by a trusted source;
hashing, by the processor, the computer readable information to obtain a hashed computer readable information;
encrypting, by the processor, the hashed computer readable information with a private key to create a digital signature, wherein the hashed computer readable information and the digital signature are stored on a block of a blockchain;

authenticating, by the processor, a user computing device in response to a request from the user computing device to download the computer readable information;

transmitting, by the processor, the public key and the digital signature to an authenticated user computing device; and instructing, by the processor, the authenticated user computing device to decrypt the digital signature using the public key to obtain the hashed computer readable information, and download the hashed computer readable information to the authenticated user computing system to retrieve the computer readable information; and creating, by the processor, a decentralized update system including at least the authenticated user computing device that acts a node of the decentralized update system to increase a source for downloading the computer readable information, wherein other user computers download the computer readable information from the authenticated user computing device verified by the blockchain;

wherein an integrity of the computer readable information is preserved by the blockchain, such that the computer readable information downloaded by the user computing device remains unchanged from the computer readable information offered by the trusted source.

16. The computer program product of claim 15, wherein the computer readable information is used to update a software application of the user computing device.

17. The computer program product of claim 16, wherein authenticating includes accessing the blockchain to determine that the user computing device is licensed to operate the software application.

18. The computer program product of claim 15, wherein the blockchain is a plurality of distributed nodes that maintain a public ledger of the hashed computer readable information and the digital signature, which preserves the integrity of the computer readable information.

19. The computer program product of claim 15, wherein authenticating includes accessing the blockchain to determine whether the user computing device has made a previous request to download the computer readable information.

20. The computer program product of claim 15, further comprising generating a transaction on the blockchain that the user computing device downloaded the computer readable information.

* * * * *